(12) United States Patent
Le et al.

(10) Patent No.: US 9,524,745 B2
(45) Date of Patent: Dec. 20, 2016

(54) DRIVE MOTOR WITH LIMITER WITH INCREASED STIFFNESS

(71) Applicant: Seagate Technology LLC, Cupertino, CA (US)

(72) Inventors: Lynn Bich-Quy Le, San Jose, CA (US); Hans Leuthold, Santa Cruz, CA (US); Chris M. Woldemar, Santa Cruz, CA (US)

(73) Assignee: Seagate Technology LLC, Cupertino, CA (US)

( * ) Notice: Subject to any disclaimer, the term of this patent is extended or adjusted under 35 U.S.C. 154(b) by 54 days.

(21) Appl. No.: 14/194,659

(22) Filed: Feb. 28, 2014

(65) Prior Publication Data

US 2015/0248913 A1 Sep. 3, 2015

(51) Int. Cl.
| | |
|---|---|
| *G11B 19/20* | (2006.01) |
| *F16C 17/10* | (2006.01) |
| *F16C 33/10* | (2006.01) |
| *F16C 33/74* | (2006.01) |

(52) U.S. Cl.
CPC ........... *G11B 19/2045* (2013.01); *F16C 17/10* (2013.01); *F16C 17/107* (2013.01); *F16C 33/106* (2013.01); *F16C 33/745* (2013.01); *G11B 19/2036* (2013.01)

(58) Field of Classification Search
CPC . G11B 19/20; G11B 19/2009; G11B 19/2036; G11B 19/2045; F16C 17/10; F16C 17/107; F16C 33/106; F16C 33/745

USPC ............................. 360/98.07, 99.08; 384/107
See application file for complete search history.

(56) References Cited

U.S. PATENT DOCUMENTS

| | | | | |
|---|---|---|---|---|
| 5,876,124 | A * | 3/1999 | Zang et al. | .................... 384/107 |
| 6,494,852 | B1 | 12/2002 | Barak et al. | |
| 6,949,852 | B2 | 9/2005 | Aiello et al. | |
| 6,982,510 | B1 * | 1/2006 | Ajello et al. | ..................... 310/90 |
| 7,391,139 | B2 * | 6/2008 | Yamamoto | ...................... 310/90 |
| 7,758,246 | B2 | 7/2010 | Aiello et al. | |
| 8,213,114 | B2 * | 7/2012 | Watanabe et al. | ......... 360/99.08 |
| 8,243,383 | B2 * | 8/2012 | Yamada et al. | ............ 360/98.07 |
| 8,780,492 | B1 * | 7/2014 | Smirnov | ..................... 360/98.07 |
| 8,810,959 | B2 * | 8/2014 | Tokunaga | .......... G11B 19/2018 310/67 R |
| 8,913,344 | B1 * | 12/2014 | Parsoneault et al. | ...... 360/99.08 |
| 8,928,196 | B2 * | 1/2015 | Smirnov | ......................... 310/90 |
| 2011/0115323 | A1 * | 5/2011 | Jang et al. | ...................... 310/90 |
| 2011/0255191 | A1 * | 10/2011 | Watanabe | .......... G11B 17/0287 360/99.08 |
| 2013/0154418 | A1 * | 6/2013 | Song | ...................... H02K 5/163 310/90 |
| 2013/0222945 | A1 * | 8/2013 | Jang | ........................ F16C 43/02 360/86 |
| 2013/0259413 | A1 | 10/2013 | Le et al. | |

(Continued)

*Primary Examiner* — Jefferson Evans (57) ABSTRACT

A device including a first axial portion, a second axial portion, and a radial portion is disclosed. A portion of the second axial portion is configured to connect to a hub. An upper surface of the second axial portion may be positioned above an upper surface of a sleeve limiter shoulder when the portion of the second axial portion is connected to the hub. The radial portion connects the first axial portion to the second axial portion. The radial portion is configured to increase stiffness by increasing surface contact between the radial portion and the sleeve limiter shoulder.

9 Claims, 6 Drawing Sheets

(56) References Cited

U.S. PATENT DOCUMENTS

| | | | | |
|---|---|---|---|---|
| 2014/0036391 A1* | 2/2014 | Kodama | ............ | G11B 19/2009 |
| | | | | 360/99.08 |
| 2014/0192438 A1* | 7/2014 | Kodama | ............ | G11B 19/2009 |
| | | | | 360/99.08 |
| 2014/0212079 A1* | 7/2014 | Kodama | ............ | G11B 19/2036 |
| | | | | 384/100 |
| 2014/0293476 A1* | 10/2014 | Choi | .................... | H02K 5/1675 |
| | | | | 360/75 |
| 2014/0293482 A1* | 10/2014 | Kodama | ............ | G11B 19/2036 |
| | | | | 360/99.08 |
| 2014/0376840 A1* | 12/2014 | Flores et al. | .................. | 384/112 |
| 2015/0015994 A1* | 1/2015 | Sugiki | ............... | G11B 19/2036 |
| | | | | 360/99.12 |
| 2015/0084463 A1* | 3/2015 | Uchibori | ............... | F16C 33/745 |
| | | | | 310/90 |
| 2015/0188386 A1* | 7/2015 | Horng | .................... | H02K 7/088 |
| | | | | 310/90 |

* cited by examiner

DRIVE MOTOR WITH LIMITER WITH INCREASED STIFFNESS

BACKGROUND

In magnetic recording media, as used in hard disk storage devices, information is written to and read from magnetic elements that represent digital bits. In order to increase the amount of information that can be stored within a given area, the size and distance between these magnetic elements may be reduced so that they may be more densely positioned. At the same time, the speed at which disks are written to and read from when preparing the disks for use by an end-user may be increased.

Noise and vibration in the disks' environment may impact the performance, e.g., read/write capability, of magnetic recording media. Further, shock events may have a higher impact on performance degradation due to the smaller size and distance of the magnetic elements. The interference caused by rapid disk rotation and other interferences may further cause random radial displacement or eccentricity of the rotating disk, resulting in non-repetitive run-out.

SUMMARY

A device including a first axial portion, a second axial portion, and a radial portion is disclosed. A portion of the second axial portion is configured to connect to a hub. An upper surface of the second axial portion may be positioned above an upper surface of a sleeve limiter shoulder when the portion of the second axial portion is connected to the hub. The radial portion connects the first axial portion to the second axial portion. The radial portion is configured to increase stiffness by increasing the surface contact between the radial portion and the sleeve limiter shoulder.

These and various other features and advantages will be apparent from a reading of the following detailed description.

BRIEF DESCRIPTION OF THE DRAWINGS

Embodiments of the present invention are illustrated by way of example, and not by way of limitation, in the figures of the accompanying drawings.

DETAILED DESCRIPTION

Reference will now be made in detail to embodiments, examples of which are illustrated in the accompanying drawings. While the embodiments will be described in conjunction with the drawings, it will be understood that they are not intended to limit the embodiments. On the contrary, the embodiments are intended to cover alternatives, modifications and equivalents. Furthermore, in the following detailed description, numerous specific details are set forth in order to provide a thorough understanding. However, it will be recognized by one of ordinary skill in the art that the embodiments may be practiced without these specific details. In other instances, well-known methods, procedures, components, and circuits have not been described in detail as not to unnecessarily obscure aspects of the embodiments.

For expository purposes, the term "horizontal" as used herein refers to a plane parallel to the plane or surface of a substrate, regardless of its orientation. The term "vertical" refers to a direction perpendicular to the horizontal as just defined. Terms such as "above," "below," "bottom," "top," "side," "higher," "lower," "upper," "over," and "under" are referred to with respect to the horizontal plane.

Increasing stiffness in order to improve the performance of a disk drive has become important given the ever-decreasing size of disk drive components. Furthermore, lower tolerances of components due to smaller component sizes have magnified the desirability of a mechanism to improve performance, e.g., by increasing stiffness, during normal operating conditions or during shock events.

Embodiments described herein provide a limiter structure for increasing stiffness. According to one embodiment, the limiter structure provides a larger contact surface with the sleeve limiter shoulder of a sleeve component, e.g., by providing more radial space. As a result, the stiffness and the damping effect of the drive increase.

In one embodiment, the limiter structure may provide a larger radial space for the stator assembly, e.g., stator mount. As a result, the stator mount thickness can be increased, thereby increasing stiffness. Furthermore, potential prominent discrete tones resulting from eccentricity between stator to magnet due to distortion/deformation, e.g., weak press fit, etc., from the stator mount may be reduced.

The limiter structure may be "S" shaped according to one embodiment. For example, the limiter structure may have two axial portions connected to one another via a radial portion. One axial portion may be connected to the hub and its upper surface may be higher than the upper surface of the second axial portion. The radial portion that connects the two axial portions may increase the contact surface area with the sleeve limiter shoulder, thereby increasing stiffness.

According to one embodiment, the limiter structure may be "U" shaped. In this embodiment, the limiter structure may have two axial portions connected to one another via a radial portion. One axial portion may be connected to the hub and its upper surface may be higher than the upper surface of the second axial portion. The radial portion that connects the two axial portions may increase the contact surface area between the sleeve limiter shoulder and the second axial portion, thereby increasing stiffness and improving performance.

Figure 1A:
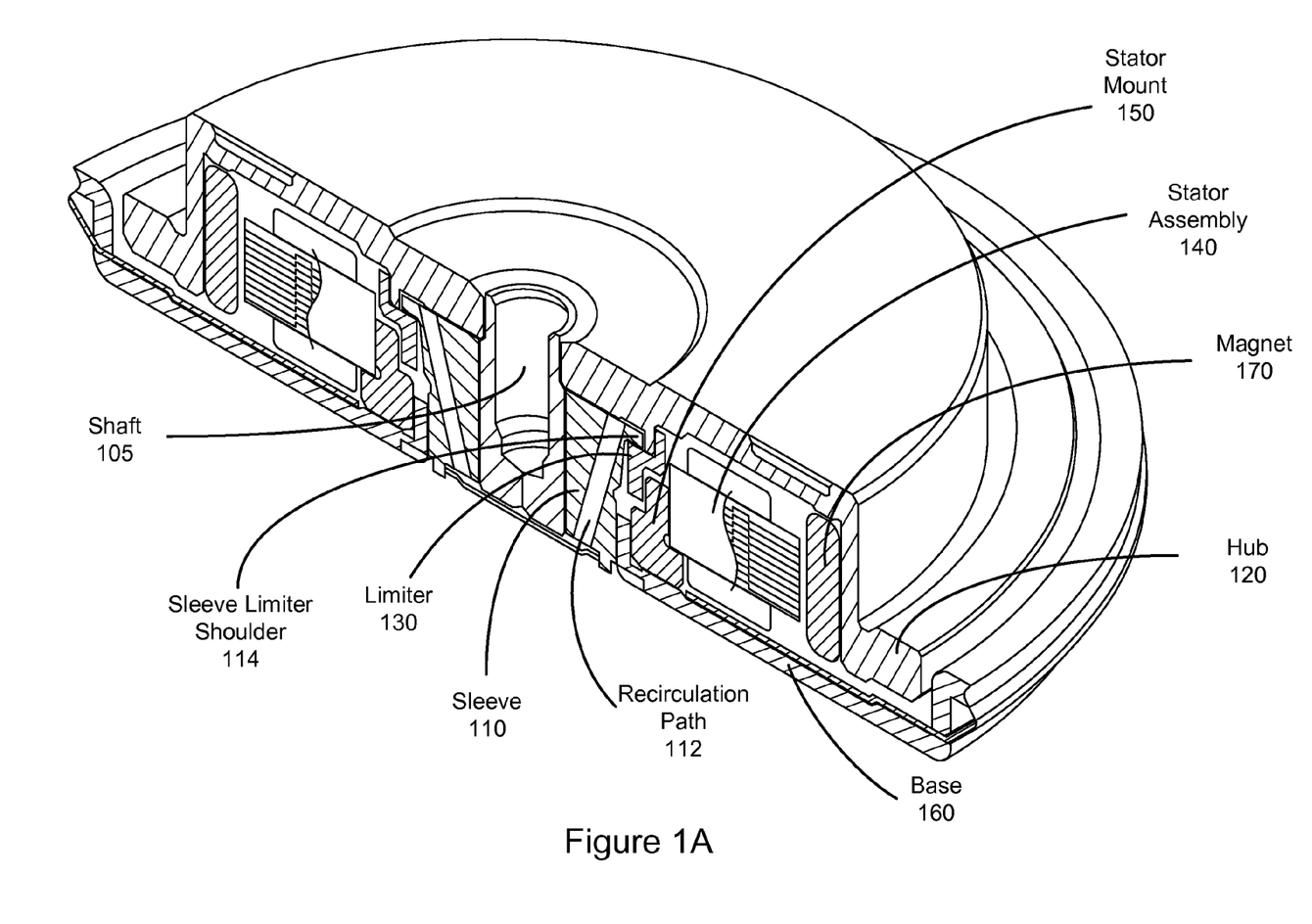
FIGS. 1A-1C show two perspective views of a hard drive with a limiter structure according to one embodiment.
Figure 1B:
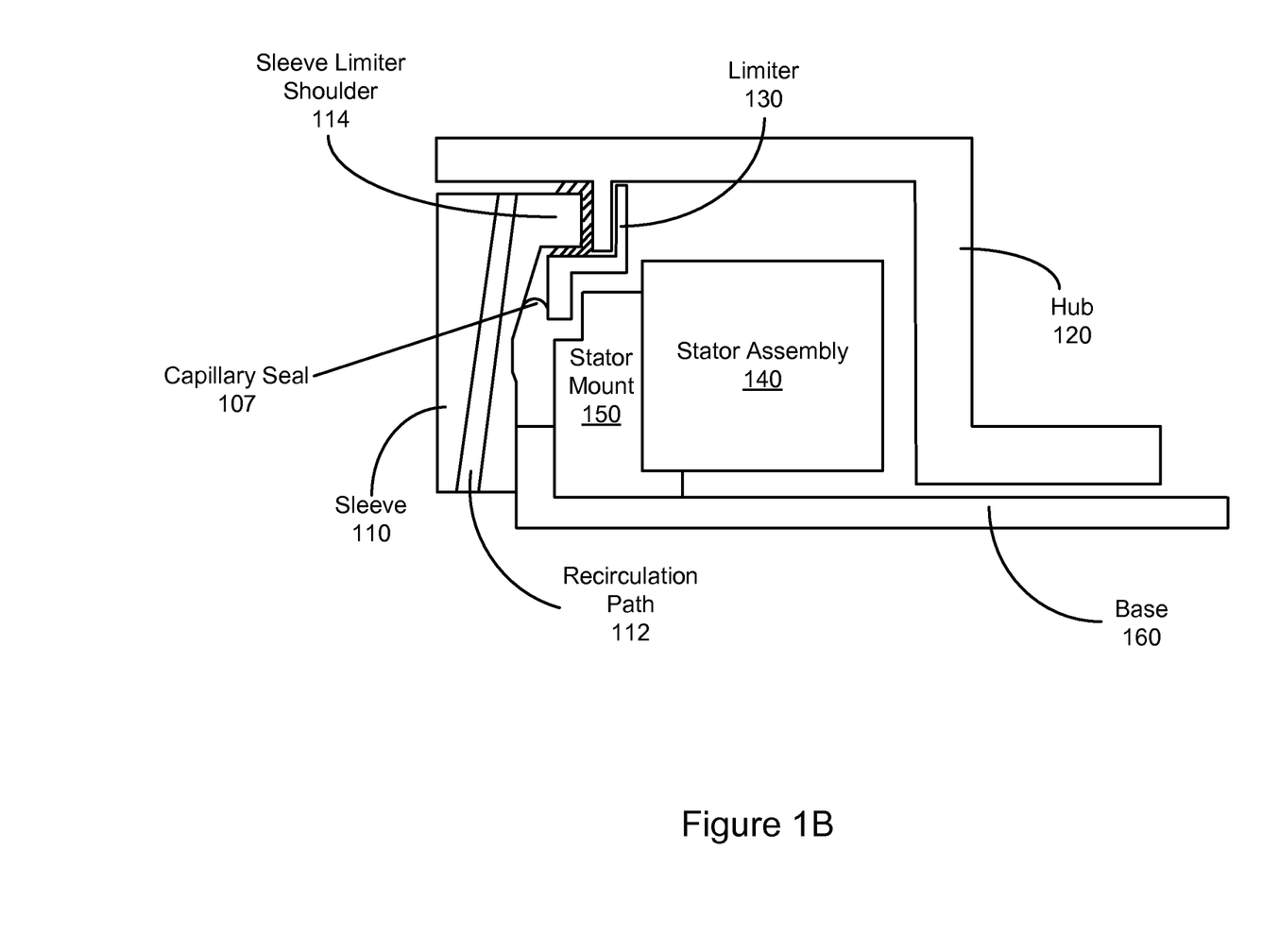

Referring now to FIG. 1A, a perspective view of a hard drive with a limiter structure according to one embodiment is shown whereas FIG. 1B shows a cross sectional view. According to one embodiment, the drive may include a shaft 105, a sleeve 110, a hub 120, a limiter 130, a stator assembly 140, a stator mount 150, and a base 160.

According to some embodiments, the sleeve 110 defines a bore for the shaft 105 and is positioned around the shaft 105. The sleeve 110 may include a journal bearing. The hub 120 is configured to support one or more disks, e.g., magnetic recording media, of a disk pack for rotation thereof. The base 160 is the base of the drive that is coupled to the stator mount 150, which supports the stator assembly 140. It is further appreciated that the base 160 coupled to the sleeve 110 may hold the shaft and the rotor.

According to some embodiments, the stator assembly 140 may include a yoke (not shown), a plurality of stator teeth (not shown), and a plurality of field coils (not shown). The hub 120 may include a back iron (not shown) or a magnet 170 coupled therewith. The magnet 170 interacts with the stator assembly 140 to induce rotation of the hub 120 and the disk pack (not shown). Adhesive bonds may be used to couple the foregoing coupled components, but coupling may also be accomplished with an interference fit, epoxy, welds, or fasteners, as desired.

The drive may further include a recirculation path 112 for conducting the lubricating fluid. The recirculation path 112 may be positioned within the sleeve 110. The recirculation system 112 may include a journal bearing, e.g., axial channel, and/or thrust bearing system, e.g., radial channel. The recirculation path 112 may be configured such that it is positioned at an angle with respect to the shaft 105 and its centerline axis. In such a configuration, the recirculation path 112 near the first axial end of the FDB motor may be at an inner radius and the recirculation channel 112 near the second axial end of the FDB motor may be at an outer radius, wherein the inner radius and the outer radius represent relative radial distances from the shaft 105 and/or centerline axis. The recirculation path 112 may be configured such that the recirculation channel 112 is parallel (not shown) to the shaft 105 and its centerline axis. In such a configuration, the recirculation path 112 near the first axial end of the fluid dynamic bearing (FDB) and the recirculation path 112 near the second axial end of the FDB are at equal radial distances from the shaft 105 and/or centerline axis. The FDB motor may further include a sealing system for sealing the lubricating fluid within the FDB motor in the bearing system, e.g., journal bearing system and/or thrust bearing system. The sealing system may include a capillary seal 107 (shown in FIG. 1B). It is appreciated that the capillary seal may include a meniscus defining an air-lubricating fluid interface (e.g. air-oil interface).

The limiter 130 is a structure used to increase stiffness during normal operation and further during shock events. In this embodiment, the limiter 130 is "S" shaped. The limiter 130 includes a first axial portion and a second axial portion. The first axial portion is a vertical component arm on the left hand side of the limiter 130. The second axial portion is a vertical component arm on the right hand side of the limiter 130. A radial portion of the limiter 130 connects the first axial portion to the second axial portion.

In this embodiment, the second axial portion is connected to the hub 120, e.g., via adhesive, and the upper surface of the second axial portion is above the upper surface of the sleeve limiter shoulder 114 of the sleeve 110. It is appreciated that a portion of the radial portion may also be connected, e.g., via adhesive, to the hub 120. According to one embodiment, the upper surface of the first axial portion and the upper surface of the radial portion are below the upper surface of the sleeve limiter shoulder 114. It is appreciated that in one embodiment, the upper surface of the radial portion may reach under the lower surface of the sleeve limiter shoulder 114 to define the axial play between the sleeve 110 and the hub 120.

Connection of the second axial portion to the hub 120 and the connection of a portion of the radial portion to the hub 120 increases overall stiffness and damping, thereby improving overall performance. Furthermore, the "S" shaped structure of the limiter 130 enables the sleeve limiter shoulder 114 to be extended, thereby increasing overall system stiffness by increasing the contact surface with the limiter 130. It is appreciated that increases in stiffness and damping may impact the hub's 120 movement with respect to the sleeve 110 during shock events. It is further appreciated that some of the increases in stiffness and damping may be attributed to an increase in surface of the oil film between the radial portion of the limiter 130 and the sleeve shoulder 114 as well as increases in rigidity by the structural stiffness of the sleeve limiter shoulder 114. It is further noted that components, e.g., sleeve 110, sleeve shoulder 114, limiter 130, etc., may be designed to optimize the radial portion of the sleeve limiter shoulder 114 and the limiter structure 130 within the bounds of available space for increased performance under shock events. It is appreciated that the stiffness may be increased using the "S" limiter structure in comparison to a conventional limiter, e.g., with one axial portion, with no radial portion, etc.

It is further appreciated that the "S" limiter structure 130 provides more radial space in comparison to the conventional system, thereby freeing up additional space that can be used for a thicker stator mount 150 to increase the overall stiffness. A thicker stator mount 150 may support joint strength from the stator press-fit, improving stiffness and reducing potential prominent discrete tones from eccentricity of the stator assembly 140 to magnet 170 if there are any deformations or distortion from the stator mount 150 that may result from a weak press-fit joint of the stator assembly 140.

With reference to FIG. 1B, it is appreciated that a small gap between the limiter 130 and the hub 120 is for delineating the limiter 130. However, in practice, the second axial portion and a portion of the radial portion are connected to the hub 120.

Figure 1C:
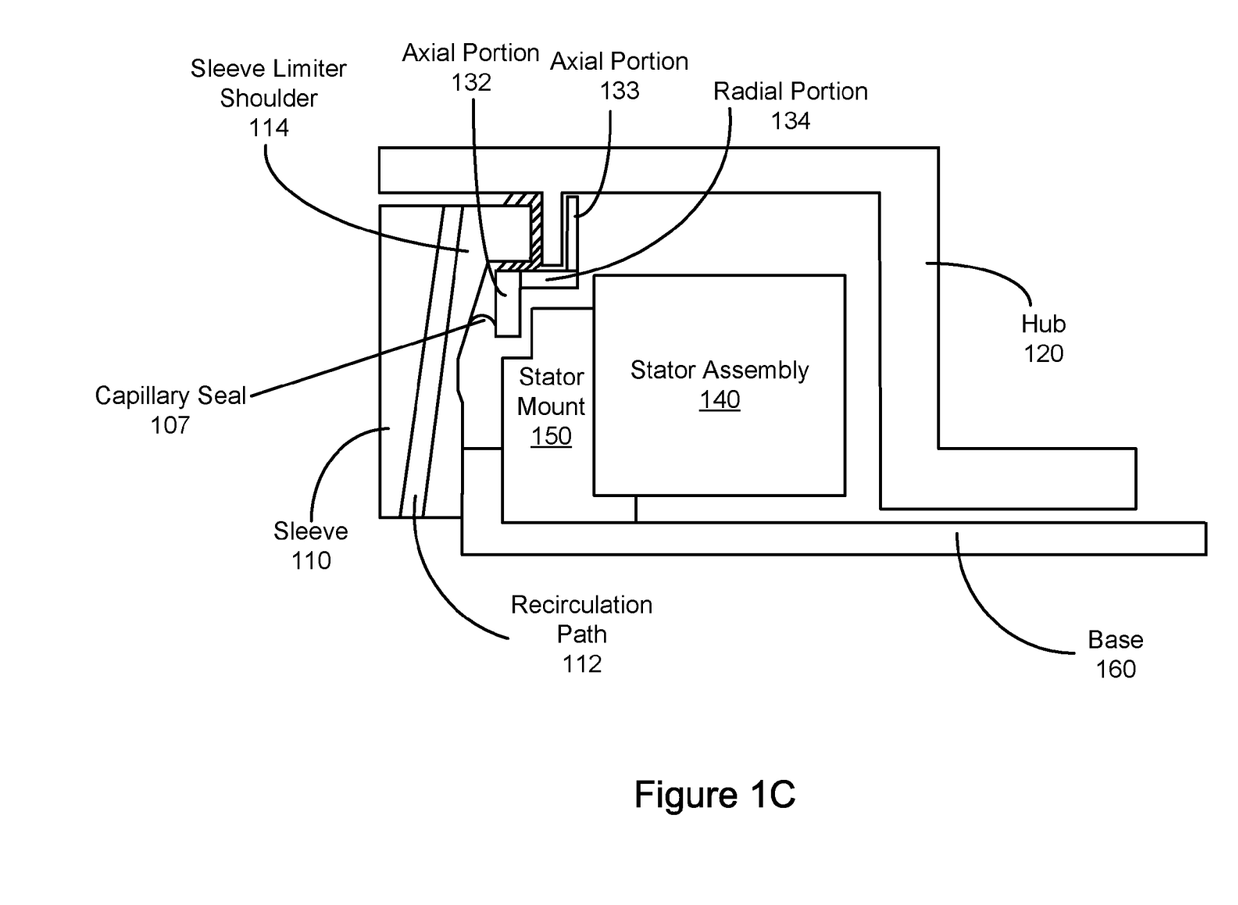

With reference to FIG. 1C, it is appreciated that the limiter 130 of FIG. 1B may include two axial portions 132 and 133, and a radial portion 134. The radial portion 134 may connect the two axial portions 132-133 to one another. According to some embodiments, as shown, a bottom surface of axial portion 133 is within the same radial plane as the top surface of axial portion 132.

Figure 2:
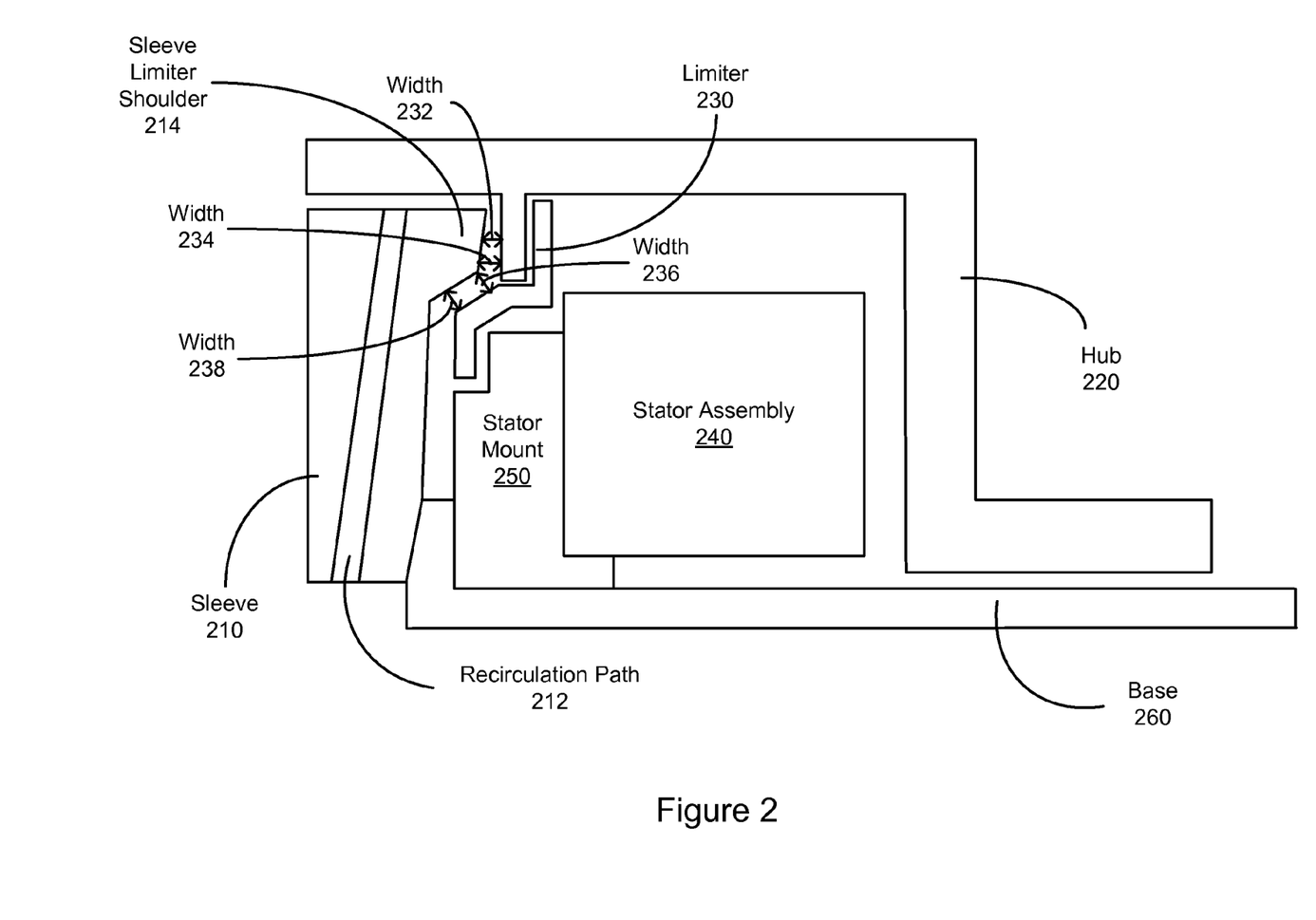
FIG. 2 shows a hard drive with an "S" limiter structure according to one embodiment.

Referring now to FIG. 2, a hard drive with an "S" limiter structure according to one embodiment is shown. It is appreciated that the sleeve 210, the sleeve limiter shoulder 214, the recirculation path 212, the hub 220, the limiter 230, the stator assembly 240, the stator mount 250, and the base 260 function are substantially similar to that of FIGS. 1A and 1B. It is appreciated that in this embodiment, a capillary seal may be present (not shown in order to avoid obscuring the drawing). In this embodiment, however, the limiter 230 is "S" shaped and its radial portion comprises two segments. The first segment is horizontal, e.g., radial, and the second segment is positioned at an angle between the radial and the axial position.

A gap may be formed between the sleeve limiter shoulder 214 and the hub 220 with a width 232. The width of the gap may increase axially, moving from the upper surface of the sleeve limiter shoulder 214 toward the base 260. In this embodiment, the width 234 is greater than the width 232. Furthermore, the gap may continue between the radial portion of the limiter 230 and the sleeve limiter shoulder 214. The width of the gap formed between the radial portion of the limiter 230 and the sleeve limiter shoulder 214 may also increase axially, moving from the upper surface of the sleeve limiter shoulder 214 toward the base 260. For example, width 238 may be greater than width 236 which may be greater than width 234 which may be greater than width 232. According to one embodiment, width 232 is less than width 234, width 234 is less than or equal to width 236, and width 236 is less than or equal to width 238. It is appreciated that the gap is formed according to the aforementioned widths to reduce the amount of bubble formation associated with the lubricant.

Figure 3:
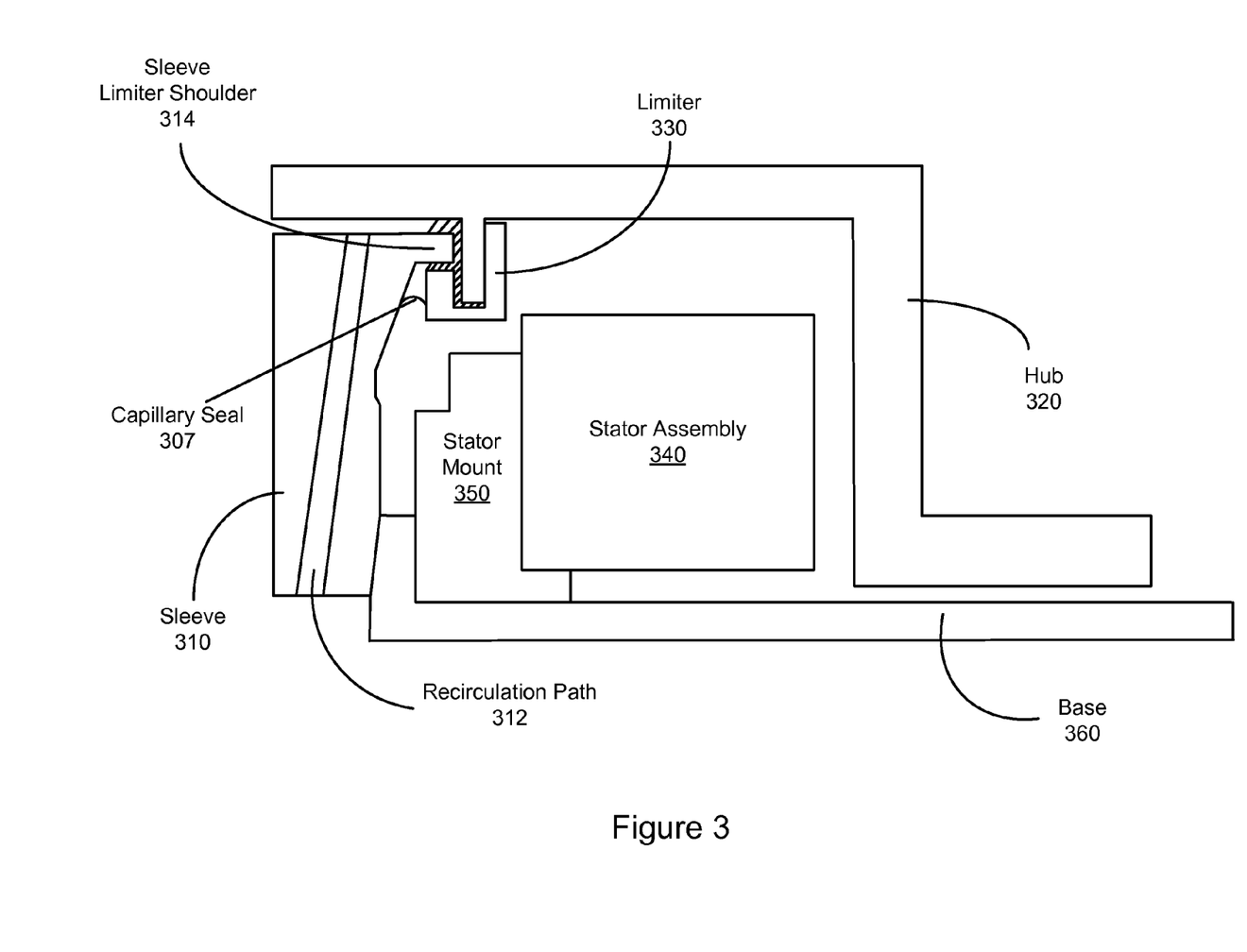
FIG. 3 shows a hard drive with a "U" limiter structure according to one embodiment.

Referring now to FIG. 3, a hard drive with a "U" limiter structure according to one embodiment is shown. In this embodiment, the sleeve 310, the sleeve limiter shoulder 314, the recirculation path 312, the hub 320, the limiter 330, the stator assembly 340, the stator mount 350, a capillary seal 307, and the base 360 function substantially similar to that of FIGS. 1A and 1B. In this embodiment, the limiter 330 is "U" shaped.

The limiter 330 includes a first axial portion and a second axial portion. The first axial portion is a vertical component arm on the left hand side of the limiter 330. The second axial portion is a vertical component arm on the right hand side of the limiter 330. A radial portion of the limiter 330 connects the first axial portion to the second axial portion.

In this embodiment, the second axial portion is connected to the hub 320 and the upper surface of the second axial portion is above the upper surface of the sleeve limiter shoulder 314 of the sleeve 310. According to one embodiment, the upper surface of the first axial portion and the upper surface of the radial portion are below the upper surface of the sleeve limiter shoulder 314.

Connection of the second axial portion to the hub 320 and the "U" shaped structure of the limiter 330 enables the sleeve limiter shoulder 314 to be extended, thereby increasing overall system stiffness and damping by increasing the contact surface with the limiter 330.

It is further appreciated that the "U" limiter structure 330 provides more radial space in comparison to the conventional system, thereby freeing up additional space that can be used for a thicker stator mount 350 to increase the overall stiffness. A thicker stator mount 350 may support joint strength from the stator press-fit, improving stiffness and reducing potential prominent discrete tones from eccentricity of the stator assembly 340 to magnet 370 if there are any deformations or distortions from the stator mount 350 that could result from a weak press-fit joint of the stator assembly 340.

Figure 4A:
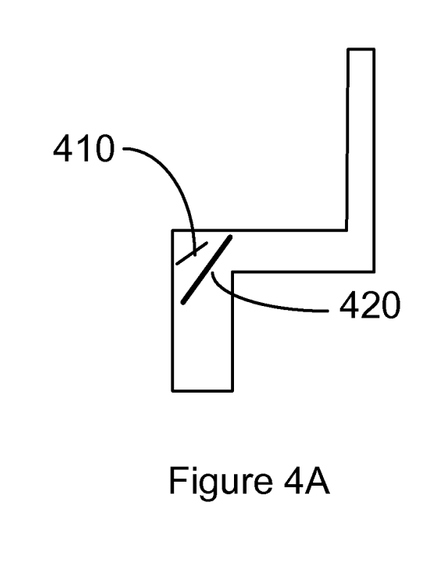
FIGS. 4A and 4B, respectively, show an "S" and a "U" limiter structure with grooves for forming bearing structures according to some embodiments.
Figure 4B:
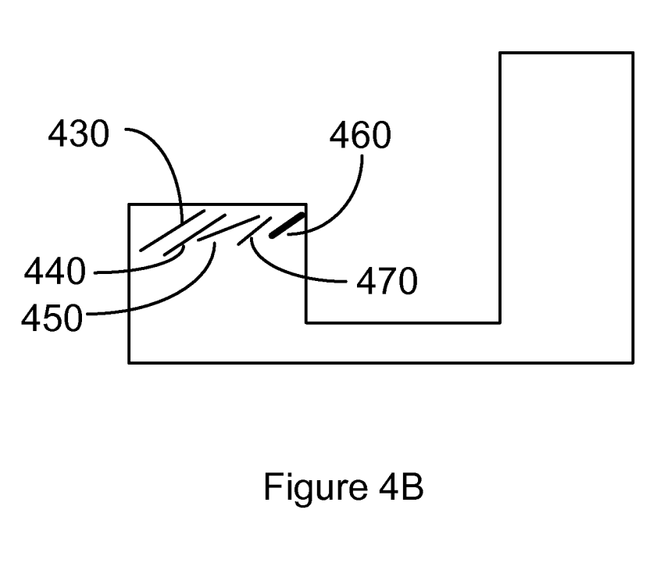

Referring now to FIGS. 4A and 4B, respectively an "S" and a "U" limiter structure with grooves for forming bearing structures according to some embodiments are shown. Referring to FIG. 4A, an "S" shaped limiter is shown. In this embodiment, the limiter may include one or more grooves, e.g., grooves 410 and 420. It is appreciated that the grooves may be of different lengths, at different angles and with different depths. For example, the length of the groove 420 is greater than the length of the groove 410 and they are at different angles. Furthermore, in this exemplary embodiment, the depth of the groove 420 is greater than the depth of the groove 410 as denoted by a thicker line.

Referring now to FIG. 4B, grooves 430-470 associated with a "U" shaped limiter are shown. In this embodiment, grooves 430 and 440 are at the same angle with the same length and the same depth. In contrast, groove 450 is positioned at an angle to groove 430 and 440 but has the same length. Groove 470 is positioned at the same angle, hence is parallel to grooves 430 and 440, but it is shorter in length than grooves 430 and 440. In comparison, groove 460 is positioned at an angle with respect to grooves 430 and 440. Furthermore, groove 460 is shorter in length than grooves 430 and 440 but its depth is greater than grooves 430 and 440, as denoted by a thicker line.

It is appreciated that the grooved limiter may provide additional stiffness and fluid bearing structure to the system. It is further appreciated that the grooves as described are lubricant containment measures and affect pressure inside the bearing assembly in various conditions, e.g., axial load, speed, temperature, etc., to reduce air intrusion into the bearing system. According to some embodiments, the grooves may be designed to increase performance and reliability of the bearing system.

Accordingly, it is appreciated that the limiter structure as described herein frees up radial space that can be used to increase the sleeve limiter shoulder size in order to increase the contact surface for increased stiffness and damping. Furthermore, the limiter structure frees up additional radial space that can be utilized to increase the thickness of the stator mount in order to increase overall system stiffness.

The foregoing description, for purpose of explanation, has been described with reference to specific embodiments. However, the illustrative discussions above are not intended to be exhaustive or to limit the embodiments to the precise forms disclosed. Many modifications and variations are possible in view of the above teachings.

What is claimed is:

1. A device comprising:
   a hub;
   a sleeve having a sleeve limiter shoulder; and
   a limiter structure, wherein a first portion of the limiter structure is connected to the hub, and wherein the first portion of the limiter structure is axially positioned above the sleeve limiter shoulder, and wherein a second portion of the limiter structure is axially positioned below the sleeve limiter shoulder, and wherein a third portion of the limiter structure connects the first portion to the second portion, wherein the limiter structure is "U" shaped, and wherein the first portion is a right portion of the "U" shape structure, the second portion is a left portion of the "U" shape structure, and the third portion is a bottom portion of the "U" shape structure.

2. The device of claim 1, wherein a gap is formed between the limiter structure connected to the hub and the sleeve limiter shoulder, wherein a width associated with the gap between the hub and the sleeve limiter shoulder increases axially toward a bottom surface of the second portion.

3. The device of claim 1, wherein a gap is formed between the limiter structure connected to the hub and the sleeve limiter shoulder, wherein a width associated with the gap between the third portion and the sleeve limiter shoulder increases axially toward a bottom surface of the second portion.

4. The device of claim 1, wherein a gap is formed between the limiter structure connected to the hub and the sleeve limiter shoulder, wherein a width associated with the gap between the second portion and the sleeve limiter shoulder increases axially toward a bottom surface of the second portion.

5. The device of claim 1, wherein a portion of the second portion of the limiter structure is grooved forming a bearing structure.

6. The device of claim 1, wherein a portion of the third portion of the limiter structure is grooved forming a bearing structure.

7. A device comprising:
   a hub;
   a sleeve limiter shoulder; and
   a limiter structure comprising:
     a first axial portion;
     a second axial portion, wherein a portion of the second axial portion is connected to the hub, wherein an upper surface of the second axial portion is positioned above an upper surface of the sleeve limiter shoulder; and
     a radial portion connecting the first axial portion to the second axial portion, wherein the limiter structure is selected from a group consisting of a "U" shaped structure and an "S" shaped structure.

8. The device of claim 7, wherein a gap is formed between the limiter structure connected to the hub and the sleeve limiter shoulder, wherein a width associated with the gap between the hub and the sleeve limiter shoulder increases axially toward the radial portion.

9. The device of claim 7, wherein a gap is formed between the limiter structure connected to the hub and the sleeve limiter shoulder, wherein a width associated with the gap between the second axial portion and the sleeve limiter shoulder increases axially toward a bottom surface of the second axial portion.

* * * * *